US010608899B2

(12) United States Patent
Chennimalai Sankaran et al.

(10) Patent No.: US 10,608,899 B2
(45) Date of Patent: Mar. 31, 2020

(54) SERVICE DIRECTORY FOR QUICK AND SIMPLIFIED APPLICATION IDENTIFICATION

(71) Applicant: Cisco Technology, Inc., San Jose, CA (US)

(72) Inventors: Ganesh Chennimalai Sankaran, Chennai (IN); Krishnamoorthy Karthikeyan, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 977 days.

(21) Appl. No.: 13/803,755

(22) Filed: Mar. 14, 2013

(65) Prior Publication Data

US 2014/0280822 A1  Sep. 18, 2014

(51) Int. Cl.
| | |
|---|---|
| *G06F 15/16* | (2006.01) |
| *H04L 12/24* | (2006.01) |
| *H04L 29/12* | (2006.01) |
| *H04L 12/26* | (2006.01) |

(52) U.S. Cl.
CPC ........ *H04L 41/5022* (2013.01); *H04L 43/028* (2013.01); *H04L 61/1511* (2013.01); *H04L 61/1541* (2013.01)

(58) Field of Classification Search
CPC ............... H04L 41/5022; H04L 43/028; H04L 61/1511; H04L 61/1541
USPC ........................................................ 709/223
See application file for complete search history.

(56) References Cited

U.S. PATENT DOCUMENTS

| | | | | |
|---|---|---|---|---|
| 6,691,168 | B1* | 2/2004 | Bal ........................ | H04L 29/06 370/351 |
| 7,774,456 | B1* | 8/2010 | Lownsbrough ......... | H04L 41/22 709/217 |
| 8,191,109 | B2* | 5/2012 | Rhodes ................... | G06F 21/31 726/3 |
| 8,542,580 | B2* | 9/2013 | Li ..................... | H04L 29/06027 370/230 |
| 8,612,612 | B1* | 12/2013 | Dukes ..................... | H04L 67/14 370/230 |
| 2007/0121615 | A1* | 5/2007 | Weill .................. | H04L 12/4633 370/389 |
| 2009/0116382 | A1* | 5/2009 | Liu ........................ | H04L 47/12 370/230 |
| 2012/0069749 | A1* | 3/2012 | Famolari ................ | G06Q 30/02 370/252 |
| 2012/0166430 | A1* | 6/2012 | Bakalov .............. | G06F 11/3006 707/723 |
| 2012/0215911 | A1* | 8/2012 | Raleigh .................. | H04L 12/14 709/224 |
| 2013/0097662 | A1* | 4/2013 | Pearcy ................. | G06F 21/577 726/1 |

(Continued)

*Primary Examiner* — Oscar A Louie
*Assistant Examiner* — Oluwatosin M Gidado
(74) *Attorney, Agent, or Firm* — Patterson + Sheridan, LLP

(57) ABSTRACT

Techniques for classifying a network flow using a service directory. Embodiments receive a request to establish a network flow with a remote service. The request specifies a network address associated with the remote service. A classification of the remote service is determined by querying a service directory using the network address and the port identifier. Embodiments also determine a network management policy to apply to the network flow, based on the determined classification.

20 Claims, 5 Drawing Sheets

(56) References Cited

U.S. PATENT DOCUMENTS

| | | | |
|---|---|---|---|
| 2013/0212265 A1* | 8/2013 | Rubio Vidales | H04L 12/14 |
| | | | 709/224 |
| 2014/0020019 A1* | 1/2014 | Carter | H04H 20/08 |
| | | | 725/39 |
| 2014/0189859 A1* | 7/2014 | Ramanan | G06F 21/56 |
| | | | 726/22 |
| 2014/0233459 A1* | 8/2014 | Dahod | H04W 72/044 |
| | | | 370/328 |
| 2014/0258489 A1* | 9/2014 | Muppala | H04L 47/2441 |
| | | | 709/223 |
| 2018/0013817 A1* | 1/2018 | O'Shaughnessy | H04L 67/06 |

* cited by examiner

SERVICE DIRECTORY FOR QUICK AND SIMPLIFIED APPLICATION IDENTIFICATION

TECHNICAL FIELD

Embodiments presented in this disclosure generally relate to traffic classification, and more specifically to techniques for classifying data flows using a service directory.

BACKGROUND

Data communication in a computer network involves the exchange of data between two or more entities interconnected by communication links and subnetworks. A local area network (LAN) is an example of a subnetwork that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and subnetworks, whereas an end station may be a computer located on one of the subnetworks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
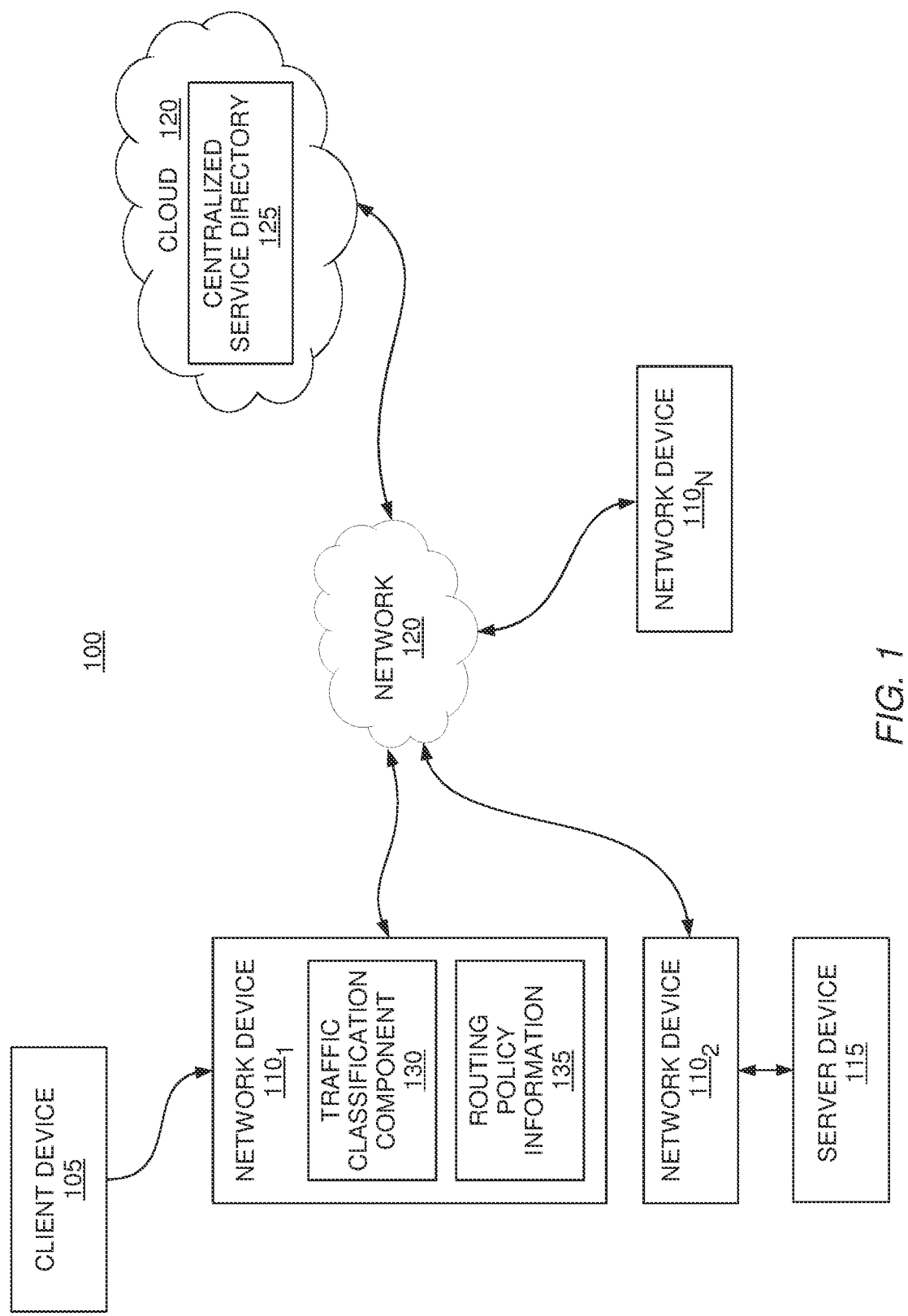
FIG. 1 illustrates a network device configured with a traffic classification component, according to one embodiment described herein.

Embodiments provide a method and network device for classifying a network flow using a service directory. The method and network device include receiving a request associated with establishing a network flow with a remote service. Here, the request specifies a network address associated with the remote service. Additionally, the method and network device include determining a classification of the remote service by querying a service directory using the network address. The method and network device also include determining a network management policy to apply to the network flow, based on the determined classification.

Another embodiment provides a method for classifying a network flow using a service directory. The method includes receiving a request associated with establishing a network flow with a remote service. Here, the request specifies a network address associated with the remote service. Additionally, the method includes determining a classification of the remote service by querying a service directory using the network address. In such an embodiment, the classification is determined using one of (i) no deep packet inspection analysis and (ii) a limited deep packet inspection analysis. The method also includes determining a network management policy to apply to the network flow, based on the determined classification.

Example Embodiments

A network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and may forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, and so on. Typically, when these management functions are performed, they are performed in actual (e.g., physical) network devices.

Generally, traffic flowing through a communications network may be viewed as a set of independent flows. For instance, a flow could consist of a set of data packets that require similar treatment by the network. Flows may be defined according to a wide range of criteria to meet different needs. For instance, a flow could be the set of packets sent from one host to another, or it could be the set of packets exchanged by a pair of communicating application programs. For example, a first flow could represent the network traffic flowing between a game client and a game server. As another example, a second flow could represent the network traffic flowing between a streaming content server and a client. In general there may be many flows passing through any point in the network at any time.

In many circumstances, select flows may be considered more important or to be of a higher priority than other flows. For instance, a flow containing voice over Internet Protocol (VoIP) data could be considered a relatively high priority flow, as any delay or interruption to such a flow may directly impact a user's experience (e.g., by interrupting the user's call). As such, it may be preferable for a network device to treat such a flow as having a higher priority when allocating the network device's fixed resources amongst the flows. In addition to relative priorities between the flows, a number of quality of service (QoS) metrics may be specified for each of the flows, which specify minimum thresholds of acceptable performance for the respective flows.

Generally speaking, a number of different techniques can be used to assign priority levels and QoS requirements for each of the flows on a network device. For instance, a user (e.g., a network administrator) could manually determine this information and could manually configure the network device accordingly. Another technique for determining flow information involves deep packet inspection (DPI). As an example, for a particular flow, logic on the network device could be configured to examine the data portion within the packets of the particular flow, as well as header information within the packets, in order to determine information about the flow (e.g., a classification of the flow, such as gaming, VoIP, content streaming, etc.). The determined information could then be used for numerous flow management purposes, including prioritization, QoS requirements, security functions and so on.

However, there are several disadvantages to such DPI techniques. For instance, one disadvantage is that such DPI techniques are typically very resource intensive, and can consume a significant portion of the network device's processing and memory resources. Additionally, such an inspection using DPI techniques typically takes a substantial amount of time to complete. This can be particularly problematic when attempting to classify flows that only exist for a relatively short length of time. That is, if a flow ceases to exist before (or shortly after) it has been classified using the deep packet inspection techniques, the DPI analysis may provide no benefit to the network device, and the resources consumed by performing the DPI analysis are in essence wasted.

As such, embodiments provide techniques for classifying a network flow using a service directory. Embodiments may receive a request associated with establishing a network flow with a remote service. In one embodiment, the request specifies a network address (e.g., an IP address) and a port identifier associated with the remote service. Embodiments also determine a classification of the remote service, by querying a service directory using the network address and the port identifier. For instance, a centralized service directory could reside on a remote server (e.g., within a cloud computing environment, within a service provider's network, etc.) and logic on the network device could submit a query to the centralized service directory using the network address and port identifier specified in the request. A network management policy to apply to the network flow is then determined, based on the classification. Advantageously, doing so enables the network device to quickly and efficiently classify and manage new network flows, even when the new network flows have a relatively short lifespan.

It is broadly contemplated that embodiments herein may be implemented on physical network devices as well as virtual network devices. Virtualization generally concerns separating a resource from underlying physical resources. Virtualization techniques can be applied to various devices and programs (e.g., computers, operating systems). These virtualization techniques can be applied to network switches as well. A virtual machine (VM) is a representation of a real machine using software that provides an operating environment that can run a host and its applications. A VM may be used to run applications and/or may be used as an appliance for a designated purpose and/or function. Even though a network switch may be virtualized, a virtual switch is typically connected in some manner to an actual, physical switch. Generally, the virtual switch provides connectivity to the physical ports of the physical switch on which the virtual switch is running (or to which the virtual switch is connected). However, one skilled in the art will appreciate that in one example a virtual switch could connect virtual machines on a single physical server and thus, in such an example, would not be connected to an actual switch.

Virtualization allows one device (e.g., a computer, a network device, etc.) to do the job of multiple devices by sharing the resources of the single device across multiple virtual environments. Generally, a VM is a tightly isolated software container that can run its own operating system and applications as if it was a physical machine. A VM generally behaves like a physical machine and has its own virtual (e.g., software-based) processor, memory, network interface card(s), and so on. However, a virtual device may be pure software and thus may be completely independent from an underlying physical hardware. Therefore, a virtual device may be migrated between different underlying physical hardware. Generally, a VM may have a number of virtual ports (also referred to as virtual interfaces) that connect to a switch (either physical or virtual).

FIG. 1 illustrates a network device configured with a traffic classification component, according to one embodiment described herein. As shown, the network environment 100 includes a plurality of network devices $110_{1-N}$, interconnected via a network 120. Here, the network device $110_1$ is connected to a client device 105, while the network device $110_2$ is connected to a server device 115. The network device $110_1$ contains a traffic classification component 130 and predefined routing policy information 135. In the depicted embodiment, the network environment 100 also includes a cloud computing environment 120, which in turn contains a centralized service directory 125. Of note, although the centralized service directory 125 is shown within the cloud computing environment 120, such a depiction is provided for illustrative purposes only and without limitation. More generally, it is broadly contemplated that the centralized service directory 125 could reside within any number of different network environments, where the centralized service directory 125 is accessible by more than one network device. For example, the centralized service directory 125 could reside within an Internet service provider's network, and could be accessible by network devices configured, each configured with a traffic classification component 130, within the Internet service provider's network.

Generally, the traffic classification component 130 could be configured to classify new network connections (also referred to herein as network flows) through the use of a service directory. For instance, the traffic classification component 130 could receive a request from the client device 105, where the request relates to establishing a new network flow with a remote service on the server device 115. For instance, the request could specify a network address corresponding to the server device 115 and a port identifier. Upon receiving the request, the traffic classification component 130 could determine a classification of the remote service by querying a service directory using the network address and the port identifier. For instance, the traffic classification component 130 could submit a query to a software component (not shown) within the cloud 120, specifying the network address and port identifier from the request. The software component could then access the centralized service directory 125 and could a classification associated with the network address and port identifier.

Upon receiving a response to the query, the traffic classification component 130 could use the classification to determine a network management policy to apply to the network flow, and could apply the determined policy to the new network flow, once the new network flow is established. For instance, such a policy contain network flow prioritization information, quality of service (QoS) information, logging information (e.g., what information should be logged, what level of detail should be logged, etc.), and so on. More generally, it is broadly contemplated that the determined policy may contain any information or rules associated with the management of network connections on a network device.

In one embodiment, the traffic classification component 130 is configured to determine a plurality of potential classifications for the network flow, based on querying the service directory using the network address and the port identifier. For instance, the service directory could contain multiple entries relating to the network address and port identifier, where each of the multiple entries corresponds to a different classification. In such an embodiment, the traffic classification component 130 could then perform a deep packet inspection on packets within the new network flow, in order to select one of the plurality of potential classifications as the classification for the network flow. Advantageously, doing so enables the traffic classification component 130 to perform a more efficient deep packet inspection that is restricted to only a subset of potential classifications (as opposed to the entire universe of potential classifications recognized by the traffic classification component 130).

Figure 2:
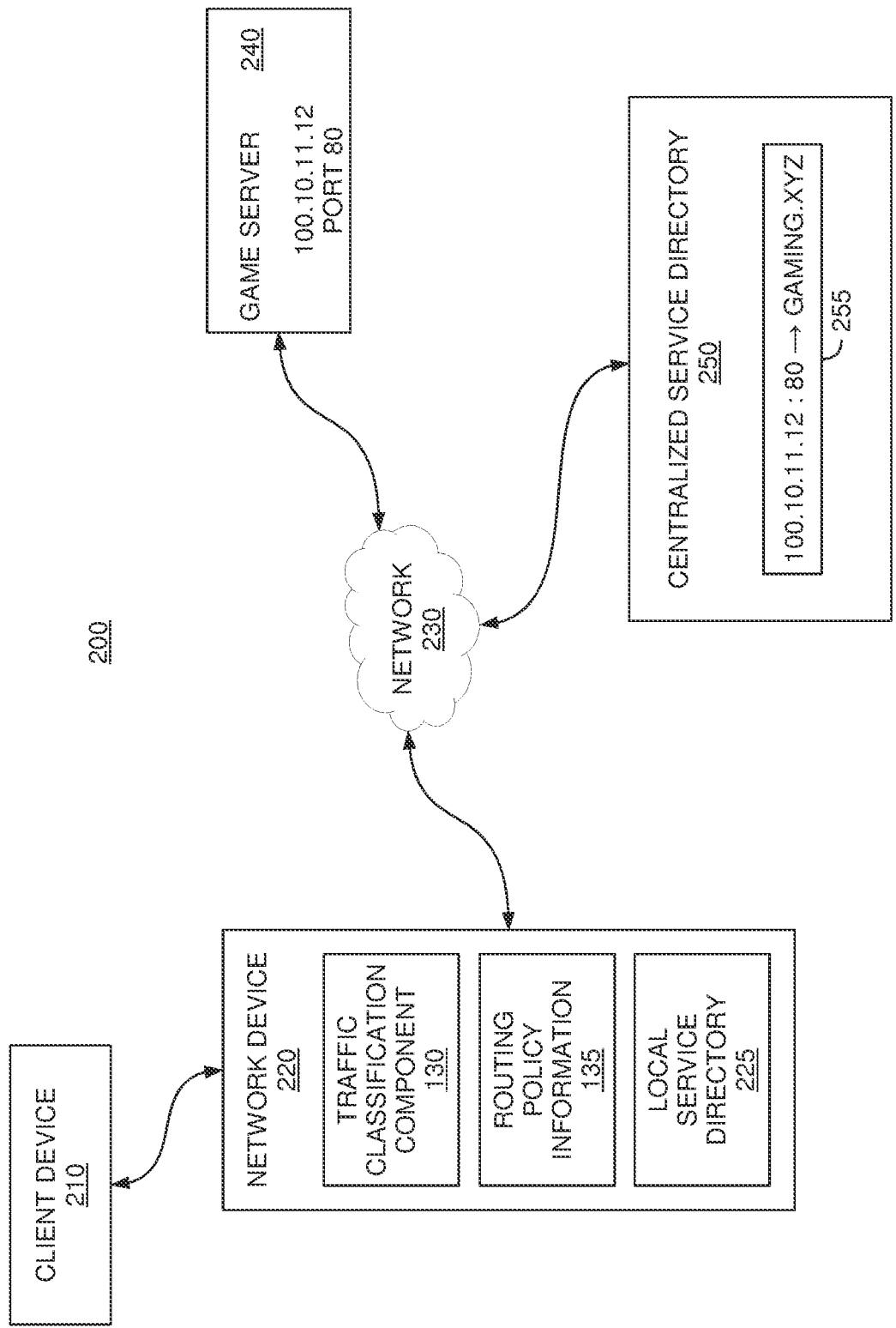
FIG. 2 illustrates a network environment including a centralized service directory and a network device configured with a traffic classification component, according to one embodiment described herein.

The traffic classification component 130 may also maintain a local service directory, in addition to (or in lieu of) the use of the centralized service directory 125. An example of such an embodiment is shown in FIG. 2, which illustrates a network environment including a centralized service directory and a network device configured with a traffic classification component, according to one embodiment described herein. As shown, the network environment 200 includes a network device 220, a game server 240 and a centralized service directory 250, interconnected via the network 230. The network device 220 is also connected to the client device 210. In the depicted embodiment, the network device 220 includes the traffic classification component 130, routing policy information 135 and a local service directory 225. Here, the game server 240 (e.g., a software application) is associated with the internet protocol (IP) address of 100.10.11.12 and is hosted at the port "80". The centralized service directory 250 (e.g., an XML file, a database, etc.) contains an entry 255, specifying that the combination of the address "100.10.11.12" and port "80" is associated with the classification "Gaming.XYZ".

Upon receiving a request to establish a new network connection with the network address "100.10.11.12" and port "80", the traffic classification component 130 could first determine whether the local service directory 225 contains an entry corresponding to this network address and port. If so, the traffic classification component 130 could use a classification associated with the entry to classify the new network connection. The classification could then be used, e.g., to determine network management information for use with the new network connection. If instead the traffic classification component 130 determines that the local service directory 225 does not contain an entry associated with this network address and port, the traffic classification component 130 could query the centralized service directory 250 (or a management application for the centralized service directory 250) using the network address and port information. Upon receiving such a query, the centralize service directory 250 (or the management application) could return the entry 255 or a portion of the entry 255 to the traffic classification component 130. Thus, in this example, the traffic classification component 130 could then classify the new network connection using the classification of "Gaming.XYZ", and could apply a management policy associated with this classification to the network connection. Advantageously, doing so enables the traffic classification component 130 to quickly and efficiently classify the new network connection, without the use of slower and more resource intensive deep packet inspection techniques.

In some embodiments, the traffic classification component 130 may employ a limited form of deep packet inspection in classifying new network flows. For instance, if the traffic classification component 130 determines that the local service directory 225 (and/or the centralized service directory 250) contains multiple classifications associated with a particular network address and port identifier, the traffic classification component 130 could then perform a deep packet inspection analysis of the new network connection to determine which of the multiple classifications should be applied to the new network connection. In doing so, the traffic classification component 130 may restrict the deep packet inspection to deciding only between the classifications in the local service directory 225 (and/or the centralized service directory 250) that pertain to the network address and port identifier, as opposed to the entire universe of potential network flow classifications. Advantageously, doing so enables the traffic classification component 130 to perform a more efficient deep packet analysis when classifying the new network connection.

Figure 3:
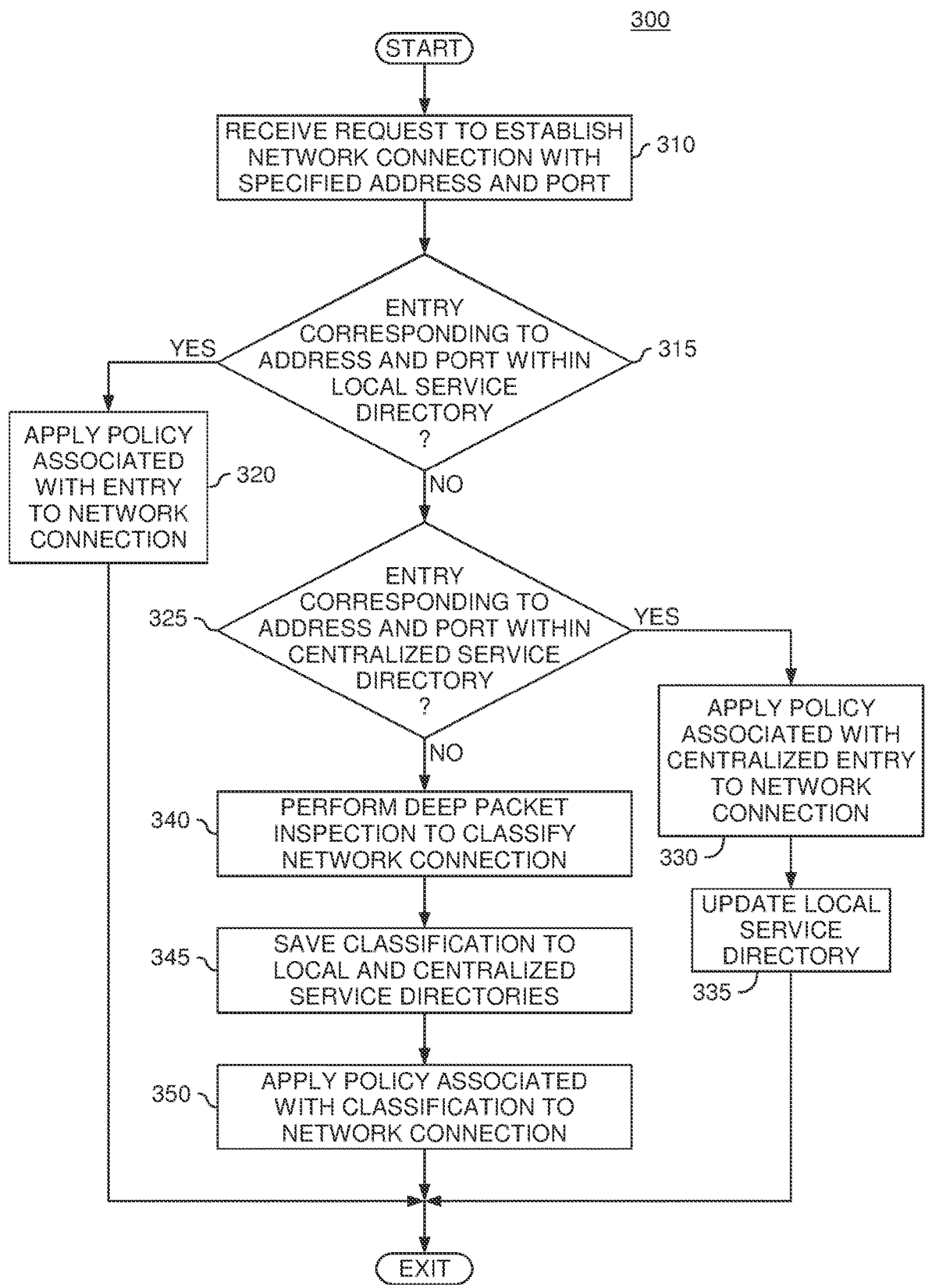
FIG. 3 is a flow diagram illustrating a method for classifying network connections using a service directory, according to one embodiment described herein.

FIG. 3 is a flow diagram illustrating a method for classifying network connections using a service directory, according to one embodiment described herein. As shown, the method 300 begins at block 310, where the traffic classification component 130 receives a request at a first network device to establish a new network connection with a specified address and port. For example, the request could be a TCP data packet(s) having the TCP SYN flag enabled, indicating the establishment of a new TCP connection. Upon receiving the request, the traffic classification component 130 determines whether an entry corresponding to the specified address and port exists within a local service directory. In this example, the local service directory represents any service directory that is local with respect to the first network device.

If the traffic classification component 130 determines an entry corresponding to the network address and port exists within the local service directory, the traffic classification component 130 could determine policy information associated with the entry in the local service directory and could apply this policy to the network connection, once the network connection is established (block 320), and the method 300 ends. For instance, such a policy could include network flow prioritization information, quality of service (QoS) information, logging information (e.g., what information should be logged, what level of detail should be logged, etc.), and so on.

In one embodiment, the local service directory comprises a plurality of entries, where each entry includes a network address, a port identifier and a service name. For example, one such service directory could include an entry specifying "100.10.11.12:80→Gaming.XYZ", where "100.10.11.12" is the network address (i.e., an IP address), "80" is the port identifier, and "Gaming.XYZ" is the service name. Upon receiving a request to establish a new network connection with the IP address "100.10.11.12" and on port "80", the traffic classification component 130 could access the service entry and could retrieve the service name "Gaming.XYZ" from the aforementioned entry. The traffic classification component 130 could then determine whether predefined network policy information exists for the service name "Gaming.XYZ". If so, the traffic classification component 130 could apply the existing network policy information to the new network connection. If not, the traffic classification component 130 could create a network policy to use with this service (e.g., based on a default policy, based on other policies associated with similar services such as other gaming services, and so on), and could apply the created network policy to the new network connection.

On the other hand, if the traffic classification component 130 determines that no entry currently exists for the specified address and port within the local service directory, the traffic classification component 130 could determine whether such an entry exists within a centralized service directory (block 325). Generally, the centralized service directory could be maintained and accessed by multiple traffic classification components, residing on multiple different network devices. For instance, an application could be configured to receive queries specifying network address and port information from the various traffic classification components. Upon receiving such a query, the application could access the centralized service directory and could retrieve any entry (or entries) in the centralized service directory corresponding to the specified address and port information. The application could then return the retrieved entry (or entries) to the traffic classification component 130 from which the query was received, or could return a message indicating that no entries were found. In one embodiment, the centralized service directory is hosted in a cloud computing environment.

If the traffic classification component 130 determines that an entry exists within the centralized service directory for the specified network address and port identifier, the traffic classification component 130 determines policy information associated with the entry in the local service directory and applies this policy to the network connection, once the network connection is established (block 330). In the depicted embodiment, the traffic classification component 130 also updates the local service directory based on the information retrieved from the centralized service directory (block 335), and the method 300 ends. Advantageously, by updating the local service directory, the traffic classification component 130 can operate more efficiently by minimizing the number of queries issued to the centralized service directory.

If instead the traffic classification component 130 determines that no entry for the network address and port identifier exists within the centralized service directory, the traffic classification component 130 performs a deep packet inspection on packets associated with the new network connection to classify the network connection (block 340). Once the classification for the network connection is determined, the traffic classification component 130 saves the classification to the local service directory and the centralized service directory (block 345). Doing so allows the traffic classification component 130 (on the current network device and, in the case of the centralized service directory, other network devices as well) to identify subsequent instances of this type of network connection more easily. Additionally, as discussed above, the centralized service directory may reside in, without limitation, a cloud computing environment, a service provider's network, a private network (e.g., a local area network or a wide area network), and so on. Of note, in one embodiment, the traffic classification component 130 is configured to not use a centralized service directory, but rather to maintain only a local service directory.

Returning to the depicted embodiment, the traffic classification component 130 also determines policy information associated with the entry in the local service directory and applies this policy to the network connection (block 350). Once the policy has been applied, the method 300 ends.

In one embodiment, the traffic classification component 130 is also configured to collect and store other information pertaining to the new network connection in the service directory. For example, such other information could include version information pertaining to the service name (e.g., for use as a sub-classification of the network flow), and virtual routing and forwarding (VRF) information associated with the network flow. The service directory could also include historical performance information, such as an average throughput associated with the network connection, a variance in throughput associated with the network connection, a time at which the connection was established, and so on. The traffic classification component 130 could then use such other information in classifying subsequent network connections. In particular, in the event that multiple entries exist within a service directory for a particular address and port identifier, the traffic classification component 130 could use this other information to distinguish between the multiple entries.

Figure 4:
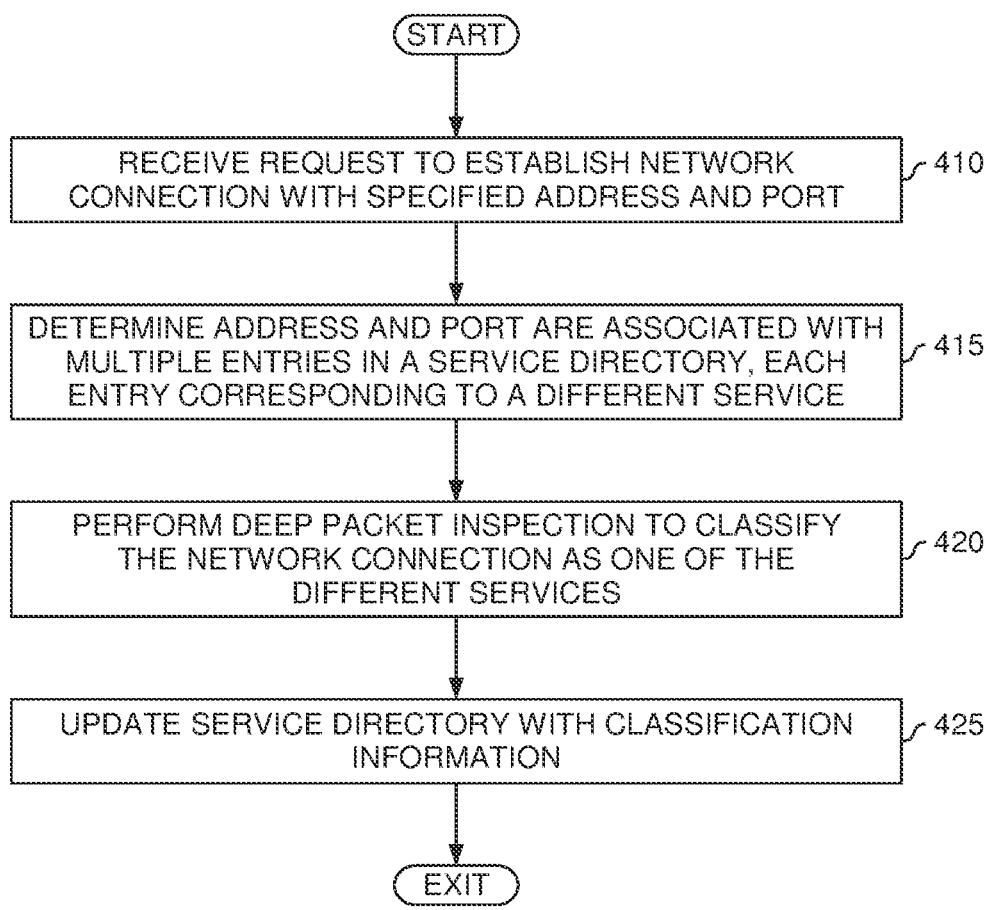
FIG. 4 is a flow diagram illustrating a method for classifying network connections using a service directory and deep packet inspection, according to one embodiment described herein.

An example of this will now be discussed with respect to FIG. 4, which is a flow diagram illustrating a method for classifying network connections using a service directory and deep packet inspection, according to one embodiment described herein. As shown, the method 400 begins at block 410, where the traffic classification component 130 receives a request to establish a new network flow with a specified network address and port identifier. For instance, the request could be a TCP data packet in which the TCP SYN flag is enabled, indicating the establishment of a new TCP data flow. In a particular embodiment, the request represents a DNS look-up request, and the traffic classification component 130 is configured to identify a potential new data flow at the time of the DNS look-up request and before the new data flow has even been created.

In the depicted embodiment, the traffic classification component 130 queries a service directory (e.g., a local service directory, a centralized service directory, etc.) and determines that the network address and port identifier specified in the request are associated with multiple entries in the service directory, where each of the multiple entries corresponds to a different service (block 415). For example, the network address and port identifier could correspond to a first entry in the service directory specifying a relatively low priority, non-realtime service (e.g., a cloud-oriented data back-up service), and could also correspond to a second entry in the service directory specifying a relatively high priority, realtime service (e.g., a VoIP session).

Upon determining that the network address and port identifier correspond to both the first and second service, the traffic classification component 130 performs a deep packet inspection on the data flow in order to select between these services (block 420). That is, in this example, the deep packet inspection performed by the traffic classification component 130 at block 420 is not an unrestricted analysis, but rather is limited to selecting only between the first service and the second service in classifying the data flow. By limiting the determination of the deep packet inspection analysis to only the first service or the second service, the traffic classification component 130 can perform a more efficient and less resource intensive deep packet inspection analysis of the data flow, as the traffic classification component 130 can exclude all other potential classifications for the data flow. The traffic classification component 130 then updates the service directory with the determined classification information (block 425), and the method 400 ends. In one embodiment, the traffic classification component 130 is configured to update the service directory only when a change to the information in the service directory is needed. In such an embodiment, the traffic classification component 130 may not perform the update at block 425, when the classification information in the service directory remains constant.

As discussed above, the traffic classification component 130 could also use metadata and other information pertaining to address and port information in order to properly classify the new network connection. For example, the service directory could contain two entries for a particular network address and port, and could further include information specified that a first one of the entries was previously associated with network connections having a relative high average throughput and the second entry was previously associated with network connections having a relatively low average throughput. In such an example, the traffic classification component 130 could then monitor the new network connection and could determine whether its average throughput best matches the first entry or the second entry, and could select one of the first and second entries in the service directory based (at least in part) on this determination.

In a particular embodiment, the traffic classification component 130 could update the service directory with information specifying how frequently a new data flow is classified as either the first service or the second service. Such probability information could then be used in future deep packet inspection analysis, as the traffic classification component 130 could give a preference to the most likely classification for the data flow based on the previous classifications of previous data flows. In one embodiment, if a particular classification is selected consistently (e.g., over a threshold percentage of the time) for a given network address and port identifier, the traffic classification component 130 could be configured to remove the other classifications for the network address and port identifier from the service directory. As an example, if the traffic classification component 130 determines (based on the service directory) that a particular network address and port identifier could correspond to either a first service or a second service, and further indicates that flows specifying the particular network address and port identifier have been classified as the first service over 90% of the time (for a given window of time), the traffic classification component 130 could remove the second service from the entry in the content directory corresponding to the particular network address and port identifier. Advantageously, doing so enables the traffic classification component 130 to manage and improve the service directory over time, resulting in more efficient and more accurate data flow classification.

Figure 5:
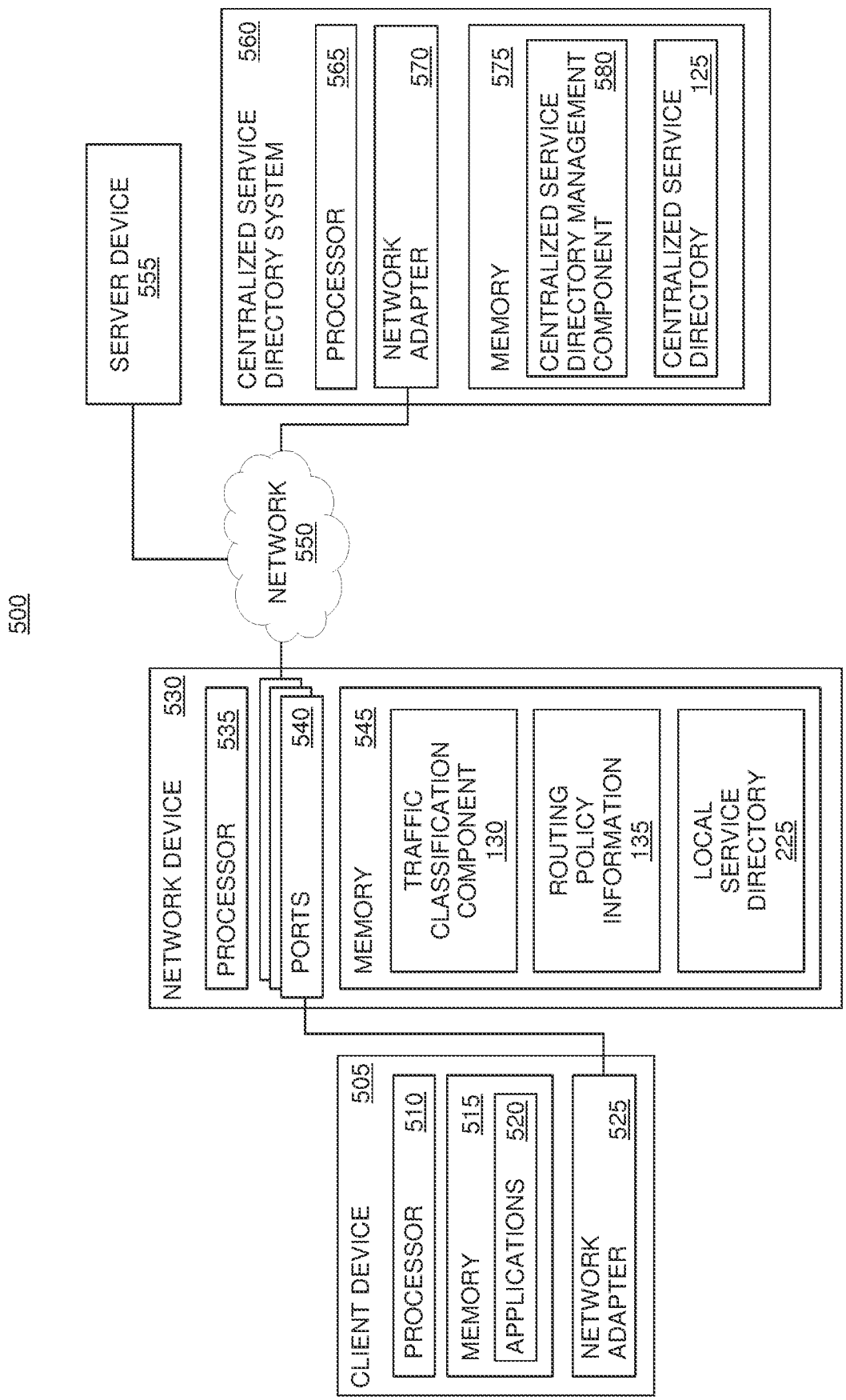
FIG. 5 illustrates a network configured with a traffic classification component, according to one embodiment described herein.

FIG. 5 illustrates a network configured with a traffic classification component, according to one embodiment described herein. The network 500 includes a client device 505, coupled to a network device 530. The client device 505 includes a processor 510, memory 515, and network adapter 525. The processor 510 may be any processing element capable of performing the functions described herein. The processor 510 represents single processor, multiple processors, a processor with multiple cores, and combinations thereof. The memory 515 may be either volatile or non-volatile memory and include, RAM, flash, cache, disk drives and the like. Although shown as a single entity, the memory 515 may be divided into different memory storage element such as RAM and one or more hard disk drives. Here, the memory 515 includes applications 520. Generally, the applications 520 represent any software and/or firmware that is configured to initiate the establishment of a network flow with a remote service. Examples of such applications include, without limitation, a gaming client, a VoIP client, a content streaming client, a VPN client, and so on. The network adapter 525 facilitates communication between the network device 530 and the client device 505. The network adapter 525 may use either wired or wireless communication techniques to transmit data to, and receive data from, the network device 530. While the network device 530 is depicted as directly connected to network adapter 525 for the client 505, such a depiction is for illustrative purposes only, and more generally any number of intermediary network devices may be located between the client device 505 and the network device 530.

The network device 530 includes a processor 535, communication ports 540, and memory 545. The processor 535 may be any processing element capable of performing the functions described herein. The processor 535 represents a single processor, multiple processors, a processor with multiple cores, and combinations thereof. The memory 545 may be either volatile or non-volatile memory and include, RAM, flash, cache, disk drives and the like. The memory 545 contains a traffic classification component 130, routing policy information 135 and a local service directory 225. As discussed above, the traffic classification component 130 is generally configured to identify a new network flow passing through the network device 530 by querying a service directory using information associated with the network flow. For instance, the traffic classification component 130 could be configured to query the local service directory 225 using an IP address and a port identifier associated with the network flow, in order to determine a classification for the network flow. Moreover, the memory 545 could also contain network logic—e.g., a content addressable memory—for forwarding data in the communication network 600. The device 530 may also include a control plane for configuring and managing the forwarding logic.

In the depicted example, the network device 530 is communicatively coupled to a sever device 555 and a centralized service directory system 560 via a network 550. Generally, the server device 555 represents any device that one of the applications 520 can establish a network flow with. For example, in an embodiment where the client device 505 represents a content player hosting a playback application 520, the service device 555 could represent a streaming content server to which the playback application 520 connects (e.g., via a TCP connection).

As shown, the centralized service directory system 560 includes a processor 565, memory 575, and network adapter 570. The processor 565 may be any processing element capable of performing the functions described herein. The processor 565 represents single processor, multiple processors, a processor with multiple cores, and combinations thereof. The memory 575 may be either volatile or non-volatile memory and include, RAM, flash, cache, disk drives and the like. Although shown as a single entity, the memory 575 may be divided into different memory storage element such as RAM and one or more hard disk drives. Here, the memory 575 includes a centralized service directory management component 580 and a centralized service directory 125. The network adapter 570 facilitates communication between the centralized service directory system 560 and the network 550. The network adapter 570 may use either wired or wireless communication techniques to transmit data to, and receive data from, the network 550.

Generally, centralized service directory management component 580 could be configured to receive queries and to process the queries using the centralized service directory 125. For instance, the traffic classification component 130 could submit a query to the centralized service directory management component 580, where the query includes a network address and a port identifier associated with a new data flow. The centralized service directory management component 580 could then process the query by retrieving an entry in the centralized service directory 125 that corresponds to the specified network address and port identifier, and returning the entry to the traffic classification component 130. Additionally, the centralized service directory management component 580 could be configured to receive requests from any number of other traffic classification components 130 residing on other network devices (not shown). Advantageously, doing so allows a number of different network devices to share and collectively manage a centralized service directory, which in turn may result in a more accurate service directory.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, the centralized service directory system 560 could be a virtual machine located in a data center for the cloud. Multiple traffic classification components 130 (e.g., residing on the network device 530 and other network devices, not shown), both within and outside of the cloud, could be configured to query and collectively manage the centralized service directory stored within the cloud. Advantageously, doing so helps to ensure efficient utilization of service module resources in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method to classify a network flow using local and centralized service directories, the computer-implemented method comprising:
receiving, from an application of an application type and executing on a client device, a request associated with establishing a network flow with a remote service executing on a server device, wherein the request is received by a traffic classifier executing on a network device, wherein the request specifies a network address associated with the remote service and further specifies a port identifier associated with the remote service, wherein the traffic classifier is configured to maintain the local service directory;
upon determining, by the traffic classifier, that the local service directory does not contain an entry corresponding to the network address, generating a query based on the network address and the port identifier, wherein the query is submitted via a network to a directory manager configured to maintain the centralized service directory on a directory system, whereafter the directory manager is configured to return a plurality of candidate classifications of the remote service that each match the network flow based on the network address and the port identifier;
performing, by the traffic classifier when executed by one or more computer processors of the network device, a limited deep packet inspection of the network flow in order to select the classification for the network flow as one of the plurality of candidate classifications, wherein the limited deep packet inspection excludes from consideration all candidate classifications of the network not in the returned plurality of candidate classifications;
determining, by the traffic classifier, a sub-classification of the remote service based on the selected classification, the sub-classification corresponding to one of a plurality of distinct versions of the application of the application type;
determining, by the traffic classifier, a network management policy to apply to the network flow, based on the determined sub-classification, whereafter the determined network management policy is applied to the network flow; and
causing, by the traffic classifier, an update to at least one of the local service directory and the centralized service directory, wherein the update is based on the network address and the selected one of the plurality of candidate classifications.

2. The computer-implemented method of claim 1, wherein each of the plurality of candidate classifications for the network flow is associated with a respective entry in the centralized service directory.

3. The computer-implemented method of claim 1, wherein the centralized service directory further specifies at least one of (i) historical performance information, and (ii) virtual routing and forwarding (VRF) information, associated with the network flow.

4. The computer-implemented method of claim 1, wherein the request is at least one of (i) a transmission control protocol (TCP) packet having a TCP synchronize (SYN) flag enabled and (ii) a domain name system (DNS) look-up request.

5. The computer-implemented method of claim 1, wherein determining the classification of the remote service is not based on a result of an unrestricted deep packet inspection analysis associated with the network flow.

6. The computer-implemented method of claim 1, wherein each candidate classification is distinct, wherein the plurality of candidate classifications excludes at least one classification, wherein the at least one classification is excluded from consideration, wherein a processing cost associated with considering the at least one classification is avoided, wherein the classification and the sub-classification are distinct, wherein each of the local service directory and the centralized service directory is updated based on the network address and the selected one of the plurality of candidate classifications.

7. The computer-implemented method of claim 6, wherein each of the plurality of candidate classifications for the network flow is associated with a respective entry in the centralized service directory, wherein the centralized service directory further specifies (i) historical performance information, and (ii) virtual routing and forwarding (VRF) information, associated with the network flow;
wherein the determined network management policy is applied to effect network flow prioritization, quality of service (QoS), and logging.

8. The computer-implemented method of claim 7, wherein the request comprises, in respective instances, (i) a transmission control protocol (TCP) packet having a TCP synchronize (SYN) flag enabled and (ii) a domain name system (DNS) look-up request;
wherein determining the classification of the remote service is not based on a result of an unrestricted deep packet inspection analysis associated with the network flow.

9. The computer-implemented method of claim 8, wherein the directory manager is operatively connected to a plurality of traffic classifiers including the traffic classifier, each of the plurality of traffic classifiers configured to execute on a respective network device and maintain a respective, local service directory, wherein the centralized service directory is maintained by the directory manager based on requests from the plurality of traffic classifiers.

10. The computer-implemented method of claim 1, wherein the directory manager is operatively connected to a plurality of traffic classifiers including the traffic classifier, each of the plurality of traffic classifiers configured to execute on a respective network device and maintain a respective, local service directory, wherein the centralized service directory is maintained by the directory manager based on requests from the plurality of traffic classifiers.

11. A network device to classify a network flow using a local and centralized service directories, the network device comprising:
one or more computer processors; and
a memory containing a program comprising a traffic classifier that, when executed by the one or more computer processors, performs an operation comprising:
receiving, from an application of an application type and executing on a client device, a request associated with establishing a network flow with a remote service executing on a server device, wherein the request specifies a network address associated with the remote service and further specifies a port identifier associated with the remote service, wherein the traffic classifier is configured to maintain the local service directory;
upon determining that the local service directory does not contain an entry corresponding to the network address, generating a query based on the network address and the port identifier, wherein the query is submitted via a network to a directory manager configured to maintain the centralized service directory on a directory system, whereafter the directory manager is configured to return a plurality of candidate classifications of the remote service that each match the network flow based on the network address and the port identifier;

performing a limited deep packet inspection of the network flow in order to select a classification for the network flow as one of the plurality of candidate classifications, wherein the limited deep packet inspection excludes from consideration all candidate classifications of the network not in the returned plurality of candidate classifications;

determining a sub-classification of the remote service based on the selected classification, the sub-classification corresponding to one of a plurality of distinct versions of the application of the application type;

determining a network management policy to apply to the network flow, based on the determined sub-classification, whereafter the determined network management policy is applied to the network flow; and causing an update to at least one of the local service directory and the centralized service directory, wherein the update is based on the network address and the selected one of the plurality of candidate classifications.

12. The network device of claim 11, wherein each of the plurality of candidate classifications for the network flow is associated with a respective entry in the centralized service directory.

13. The network device of claim 11, wherein the centralized service directory further specifies at least one of (i) historical performance information, and (ii) virtual routing and forwarding (VRF) information, associated with the network flow.

14. The network device of claim 11, wherein the request is at least one of (i) a transmission control protocol (TCP) packet having a TCP synchronize (SYN) flag enabled and (ii) a domain name system (DNS) look-up request.

15. The network device of claim 11, wherein determining the classification of the remote service is not based on a result of an unrestricted deep packet inspection analysis associated with the network flow.

16. The network device of claim 11, wherein each candidate classification is distinct, wherein the plurality of candidate classifications excludes at least one classification, wherein the at least one classification is excluded from consideration, wherein a processing cost associated with considering the at least one classification is avoided, wherein the classification and the sub-classification are distinct.

17. The network device of claim 11, wherein the directory manager is operatively connected to a plurality of traffic classifiers including the traffic classifier, each of the plurality of traffic classifiers configured to execute on a respective network device and maintain a respective, local service directory, wherein the centralized service directory is maintained by the directory manager based on requests from the plurality of traffic classifiers.

18. A non-transitory computer-readable medium containing computer program code of a traffic classifier, the computer program code executable to perform an operation to classify a network flow using local and centralized service directories, the operation comprising:

receiving, from an application of an application type and executing on a client device, a request associated with establishing a network flow with a remote service executing on a server device, wherein the request specifies a network address associated with the remote service and further specifies a port identifier associated with the remote service, wherein the traffic classifier is configured to maintain the local service directory;

upon determining that the local service directory does not contain an entry corresponding to the network address, generating a query based on the network address and the port identifier, wherein the query is submitted via a network to a directory manager configured to maintain the centralized service directory on a directory system, a plurality of candidate classifications of the remote service that each match the network flow based on the network address and the port identifier;

performing a limited deep packet inspection of the network flow in order to select a classification for the network flow as one of the plurality of candidate classifications, wherein the limited deep packet inspection excludes from consideration all candidate classifications of the network not in the returned plurality of candidate classifications;

determining a sub-classification of the remote service based on the selected classification, the sub-classification corresponding to one of a plurality of distinct versions of the application of the application type;

determining a network management policy to apply to the network flow, based on the determined sub-classification, whereafter the determined network management policy is applied to the network flow; and causing an update to at least one of the local service directory and the centralized service directory, wherein the update is based on the network address and the selected one of the plurality of candidate classifications.

19. The non-transitory computer-readable medium of claim 18, wherein each candidate classification is distinct, wherein the plurality of candidate classifications excludes at least one classification, wherein the at least one classification is excluded from consideration, wherein a processing cost associated with considering the at least one classification is avoided, wherein the classification and the sub-classification are distinct.

20. The non-transitory computer-readable medium of claim 18, wherein the directory manager is operatively connected to a plurality of traffic classifiers including the traffic classifier, each of the plurality of traffic classifiers configured to execute on a respective network device and maintain a respective, local service directory, wherein the centralized service directory is maintained by the directory manager based on requests from the plurality of traffic classifiers.

* * * * *

UNITED STATES PATENT AND TRADEMARK OFFICE
CERTIFICATE OF CORRECTION

PATENT NO. : 10,608,899 B2
APPLICATION NO. : 13/803755
DATED : March 31, 2020
INVENTOR(S) : Ganesh Chennimalai Sankaran et al.

Page 1 of 1

It is certified that error appears in the above-identified patent and that said Letters Patent is hereby corrected as shown below:

In the Claims

In Column 13, Line 29, in Claim 1, delete "select the" and insert -- select a --, therefor.

In Column 14, Line 47, in Claim 11, after "using" delete "a".

Signed and Sealed this
Ninth Day of June, 2020

Andrei Iancu
*Director of the United States Patent and Trademark Office*